United States Patent [19]

Schilf

[11] 4,349,051
[45] Sep. 14, 1982

[54] THERMAL INSULATION OF VESSELS AND METHOD OF FABRICATION

[76] Inventor: Lothar Schilf, Am Freibad 9, 2807 Achim, Fed. Rep. of Germany

[21] Appl. No.: 133,408

[22] Filed: Mar. 24, 1980

[30] Foreign Application Priority Data

Mar. 23, 1979 [DE] Fed. Rep. of Germany ....... 2911416

[51] Int. Cl.³ .......................... F16L 9/18; B65D 90/06
[52] U.S. Cl. .................................... 138/149; 220/422; 220/429; 220/450
[58] Field of Search ...................... 220/422, 429, 450; 52/809; 138/149; 428/36, 69, 212, 331

[56] References Cited

U.S. PATENT DOCUMENTS

| | | | |
|---|---|---|---|
| 1,654,094 | 12/1927 | Riek | 52/809 X |
| 2,108,212 | 2/1938 | Schellens | 222/468 X |
| 2,164,143 | 6/1939 | Munters | 220/422 |
| 2,513,749 | 7/1950 | Schilling | 220/422 X |
| 2,599,210 | 6/1952 | Thompson | 138/149 |
| 2,676,773 | 4/1954 | Sanz et al. | 220/450 |
| 2,970,042 | 1/1961 | Lagerwey | 220/450 |
| 3,207,354 | 9/1965 | Skinner et al. | 220/423 X |
| 3,361,284 | 1/1968 | Luka et al. | 220/429 |
| 3,812,886 | 5/1974 | Hallwood | 138/149 |

FOREIGN PATENT DOCUMENTS 1061204 3/1967 United Kingdom ................. 428/69

*Primary Examiner*—Joseph Man-Fu Moy
*Assistant Examiner*—Gary E. Elkins
*Attorney, Agent, or Firm*—Brisebois & Kruger

[57] ABSTRACT

An insulation arrangement in which a sheath (2) having at least one thin deformable wall (3), for example of foil, contains a powder insulating material (10), with a high vacuum within the sheath. The vacuum can be drawn through an opening (8) after a filter (9) is inserted to prevent removing the powder when the vacuum is drawn. The insulation arrangement can take the form of a panel or a pipe, and the thin wall (3) can be mechanically deformed after the vacuum is drawn.

3 Claims, 4 Drawing Figures

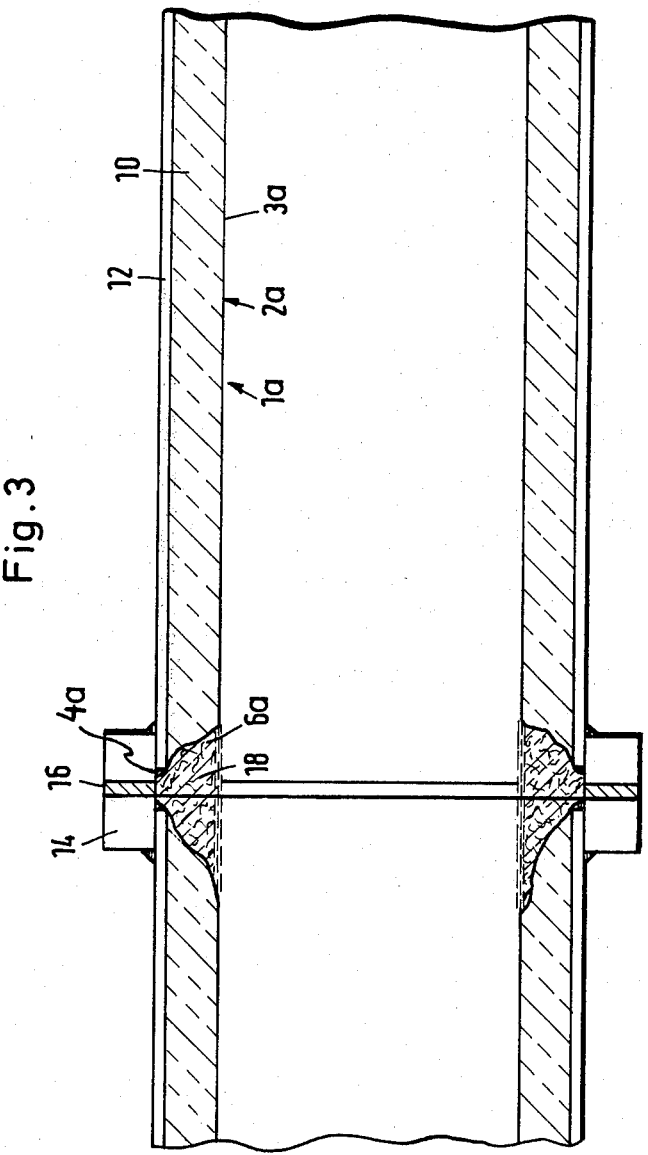

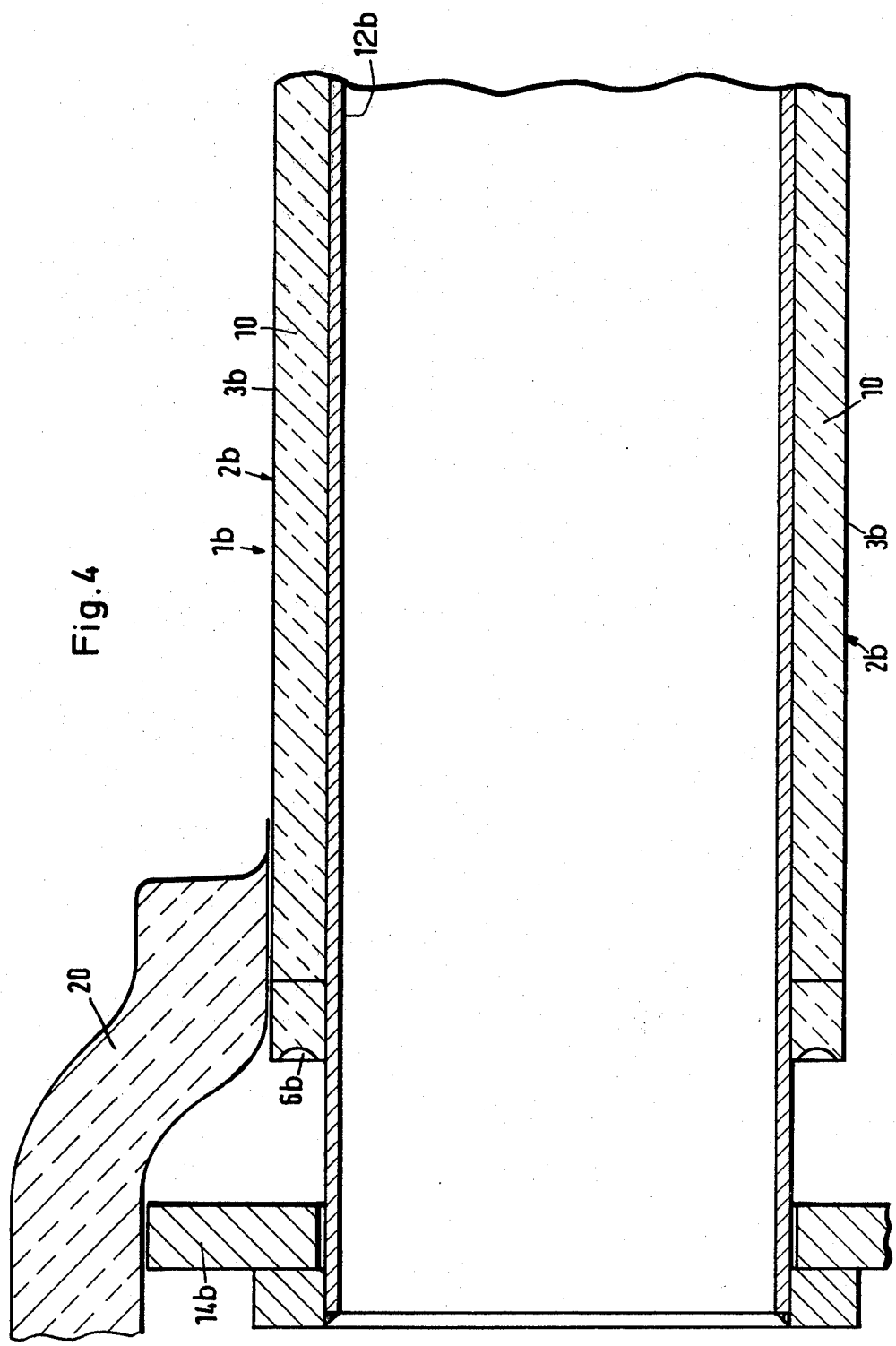

THERMAL INSULATION OF VESSELS AND METHOD OF FABRICATION

BACKGROUND OF INVENTION AND PRIOR ART

This invention relates to an arrangement for the thermal insulation of high-pressure vessels, pipes, or similar structures, and includes a vacuum-tight sheath with a thin wall and a vacuum-tight sealable opening for filling with insulating material. The invention furthermore relates to a process for the fabrication of an arrangement of this type.

Insulation systems utilizing a vacuum have been known for a long time from cryogenic technology, for example, in the form of so-called DEWAR flasks. These systems are based upon avoiding heat transfer by thermal convection. Because heat transfer by conduction is practically eliminated at the same time, the heat can only be transferred by radiation. In order to counter this, the surfaces of these systems, insofar as heat transfer by radiation could occur between them, are generally made reflective, or the radiation is reduced by the placement of low-emission foils.

From U.S. Pat. No. 1,071,817 a pressure-resistant vessel is known, which also has a pressure-resistant outer casing. The space between the casing and the vessel is evacuated in order to achieve the desired thermal insulation. In addition, the space between casing and vessel is filled with a finely divided material in powder form with absorption properties in order to absorb gas molecules released from the casing or entering through leaks to preserve the vacuum for as long as possible. Either sublimed $SiO_2$ or carbon in powder form is used as the filling material.

Furthermore, from U.S. Pat. No. 2,000,882 as well as from U.S. Pat. No. 2,863,584 double-walled vessels, whose walls are held apart from one another by spacers, are known. The space between the walls is filled with a porous filling material, e.g., diatomaceous earth. A piping system within the filling space is used in order to evacuate the filling space. The atmospheric pressure acting against the walls is intercepted by the spacers. These spacers and the evacuating pipes represent thermal bridges, which impair the insulating properties and make use at high temperatures impossible.

According to U.S. Pat. Nos. 2,108,212, the filling of the double-walled vessel with charcoal in powdered form according to U.S. Pat. No. 1,071,817 has not proved satisfactory because this material is particularly hygroscopic, and as a result the otherwise good insulating properties are counteracted, insofar as there is no heating simultaneously with filling in order to drive off the moisture.

Moreover, according to U.S. Pat. No. 2,108,212 the briquetting of the carbon or pressing into plates and the positioning of the material in this form between the two walls of an evacuated sheath or of an evacuable double-walled vessel to provide support from one wall to the other was attempted in order to achieve improved strength. It was found, however, that the mechanical compression of the finely powdered carbon leads to the caking of this material and that as a result the otherwise good insulating properties are lost. This effect also occurs when carbon in powder form is filled between flexible thin walls with no spacers and is expected to serve as the spacing material. The disadvantages of spacers are then indeed avoided, moreover the use of briquetted filling plates of carbon powder—with relatively poor thermal insulation is eliminated. The filling of carbon powder between the flexible walls is, however, also strongly compressed by atmospheric pressure after evacuation with the result that the individual carbon particles cake together and produce an undesirable high solid thermal conductivity.

In order to avoid the disadvantages occurring from the use of carbon powder for self-supporting insulating elements, it was proposed in U.S. Pat. No. 2,108,212 that the carbon powder be pressed into a granulate before filling because then the solid thermal conductivity within the carbon is very small as a result of the minimum contact of the individual granules, and the worrisome caking of the carbon particles is certainly avoided. At the same time a relatively large surface area remains, and thereby good absorption properties of the carbon material are retained. Moreover, the granulate should maintain the space between the sheath walls certainly and reliably. A disadvantage is that in the case of self-supporting plates filled with carbon granulate the additional granulate production which is necessary results in higher costs and particularly the use of plates of this type or insulating elements is not possible under high-pressure conditions because then the individual granules break and cake under the working of the outer pressure.

From U.S. Pat. No. 2,164,143 a process for the fabrication of thermal insulating elements, which are designed to be self-supporting (i.e., without spacers) and which consist of a flexible, thin sheath that is filled with a porous material in powder form, e.g., carbon or diatomaceous earth and then evacuated, is known. According to this known process, a sheath of thin, flexible material is filled with the porous material in powder form. Thereby the sheath is enclosed in a supporting form, and the filling material is pressed together so that the filling material exerts a mechanical pressure against the sheath. Finally, the sheath is closed, and gas is evacuated from the sheath, whereby the mechanical pressure of the filling material is exerted against the outer atmospheric pressure and opposes it. This known fabrication process satisfies its purpose, namely, the fabrication of dimensionally exact insulating elements through corresponding pre-compression of the insulating material in filling, only for insulating elements used with an outer atmospheric pressure because only then is the compensation between the pre-compression pressure working from the inside against the sheath and the outside atmospheric pressure guaranteed. Moreover, the elements fabricated by this process have an evacuating pipe system within the filling space, which makes the elements inappropriate for applications in high-temperature regions because of the resulting thermal bridges.

For high-pressure and high-temperature applications an evacuated insulating element, which also possesses a sheath of thin, flexible foil material or sheet as well as an insulating material within the sheath or spacer, was proposed in DE-OS 26 15 299. Glass-fiber felt is proposed as the insulating material. As a result of its relatively great hardness, the fibers of the glass-fiber felt generally touch one another by point contact even after the evacuation so that at the crossing points of two fibers, respectively, a high thermal resistance results; and the thermal conductivity through the element possesses the desired low value. The thermal conductivity $\lambda$ is approximately a factor of 10 smaller for this element than for known hard-foam plates or plates of mineral or glass fibers.

The known evacuated element from DE-OS 26 15 299 possesses the disadvantage that only with the utilization of absorption substance within the filling space can the vacuum be maintained under a permissible final pressure of approximately $10^{-1}$ torr because the glass-fiber felt possesses no absorption properties. Even with the use of absorber substances only lifetimes of less than 30 years can be achieved. Moreover, the glass fibers cake at over 400° C. and then have unfavorable high body thermal conductivity. As a result of the very low packing density of the glass fibers, which occupy approximately 10% of the volume, and of the disordered orientation, the glass fiber felt is moreover only reversibly compressible and returns to the unloaded condition after pressure release. Thence, the elements under alternating pressure loading experience unpredictable microscopic deformations which can lead to the damaging of the glass-fiber felt and the sheath.

SUMMARY OF THE INVENTION

As compared with this, the object of the invention is to provide an insulating arrangement which possesses a very low thermal conductivity and a very long lifetime, is simple and inexpensive to fabricate, is relatively dimensionally stable, and withstands high-temperature stresses as well as high-pressure applications.

In accordance with this invention, an arrangement is proposed which contains a vacuum-tight, at least partly thin wall sheath with a vacuum-tight sealable opening for filling with insulating material, in which the sheath is evacuated and sealed vacuum-tight after the filling. This arrangement is characterized accord to the invention by the fact that insulating material consists of a material in powder form with open pores and irregular form of the powder particles, and is compressed with a given high pressure after the sealing of the sheath.

The advantages of the invention lie particularly in that the powder particles of the insulating material support one another with small contact areas as a result of their irregular form so that sufficiently many, and adequately small interstices remain which permit the evacuation of the air from the insulating material without an evacuating-pipe system within the sheath. By this means inhomogeneities within the filling space and associated thermal-conductivity paths are eliminated; the arrangements possess, with the exception of the unavoidable boundary effects, very homogeneous, and uniform insulating properties.

In particular, it has been found that the insulating material used according to the invention permits post-compression of the sheath from outside after evacuation and sealing of the sheath without degarding the insulating properties significantly. Post-compression with pressures of several hundred bars is possible and produces an irreversible deformation of the flexible sheath walls.

An important characteristic of the invention consists of the appropriate choice of the porous insulating material in powder form and of the appropriate irregular form of the powder particles. By this choice slight contact of the powder particles with each other is guaranteed; at the same time the insulating material is compressible from outside at least to the desired operating pressure, while changing the packing density of the powder particles as well as their form only to a minor extent.

The insulating material possesses a very large surface area as a result of the open pores, which adsorb residual gases in the vacuum efficiently over a long time, whereby a desired long lifetime, several hundred years, can be achieved without additions of absorber substances.

The arrangement for thermal insulation according to the invention withstands high pressures up to several hundred bars and high temperatures to approximately 1000° C. with reliability and is appropriate particularly in applications for coal gasification, coal liquefaction, or fluidized-bed fired coal power plants.

The opening of the sheath preferably takes the form of an exhaust connection, through which the insulating material is poured and which after filling serves for the evacuation of the sheath. In order to hinder the sucking out of the insulating material during evacuation, preferably an air-permeable mat, which fills a certain space located before the exhaust connection, is placed on the insulating material so that a desired exhaust area is realized.

The use of powdered natural or synthetic diatomaceous earth which possesses a low thermal conductivity contains pores in capillary form open to the outside, and whose individual particles possess a very irregular structure, e.g., star-shaped, lanceolate, spherical, etc. is particularly preferred. The particle size of this material lies preferably in the range from 1 to approximately 100 microns and the pore size lies in the range of a few microns. This material possesses all properties which are necessary for the fabrication at favorable costs of thermal insulating elements of high quality and very long lifetime and great accuracy. The strength and the form of the powdered diatomaceous earth permits an irreversible compressibility, as the result of which a good accuracy and regular surface of the elements even without the use of stabilizing peripheral supports, etc. as well as use in a high-pressure environment are readily attainable. Because of the capillary pores, the longterm absorption is very great. Moreover, the mean free path of the residual gases in an evacuated insulating system with diatomaceous earth is in the range of approximately 10 torr so that the thermal conductivity begins to increase significantly only above approximately 10 torr. Tests performed over a period of approximately 3 months, which were initiated at a lower pressure value of $2.7 \times 10^{-3}$ mbar, have shown, by extrapolation, that the upper boundary pressure of 10 torr is first reached at a lifetime of 1800 years.

In the arrangement according to the invention, the thermal conductivity $\lambda$ is of the order of magnitude of a few $10^{-3}$ watt/m-degree-Kelvin at outer pressures of several 10 bars and is only degraded at much higher outer pressures by a maximum of ten.

The diatomaceous earth preferrably contains $SiO_2$ which amounts to more than 80 weight-percent. The portion of $Fe_2O_3$ in the diatomaceous earth preferably lies between 5 and 15 weight-percent; the portion of $Al_2O_3$ preferably amounts to less than 5-weight-percent, and the portion of CaO preferably amounts to less than 2 weight-percent. Moreover, traces of $K_2O$ and MgO are contained in the diatomaceous earth. With diatomaceous earth of this composition, the invention can be accomplished particularly advantageously.

As a result of the pouring properties of the powdered porous insulating materials, particularly of the diatomaceous earth, arrangements according to the invention can be produced so that a vacuum-tight sheath of foil or thin sheet with a vacuum-tight sealable opening is fabricated and then filled with the powdered porous insulating material. The insulating material is heated before or during and/or after the filling so that it is gas-free, and during and/or after the filling the sheath is evacuated and then sealed vacuum-tight. Corresponding to the process according to the invention, a given high pressure applied to at least parts of the sheath from outside after the sealing of the sheath brings parts of the sheath irreversibly into their final condition. By this post-compression the products of the process achieve their final form. Because the pressure of the post-compression corresponds at least to the expected operating pressure to which the arrangement fabricated in this fashion is exposed, it is guaranteed that the arrangement experiences no further deformation or damage during its operation. Surprisingly, it was therefore found that post-compressing even up to several hundred bar does not appreciably impair the thermal-insulating properties.

Alternatively, it is possible to pre-compress the arrangement during or after the filling with a first given pressure, which is preferably about atmospheric pressure. Thereafter the arrangement is evacuated and sealed air-tight. Finally, a further compression is performed by means of a given second pressure applied from outside to parts of the arrangement, as a result of which parts of the sheath experience an irreversible cold deformation. The heating of the sheath and of the insulating material poured into it can take place during or after the pre-compression and/or evacuation. This procedure is appropriate, for example, for the fabrication of insulated pipes for which the pipe wall represents a part of the sheath. The other part of the sheath is, for example, made up of a pipe-shaped inner case of thin sheet, which is located at a given distance from the inner surface of the pipe and which is joined vacuum-tightly at the pipe ends. The insulating material is filled between the inner case and the pipe, pre-compressed and then evacuated. Finally, the inner space of the pipe is filled with a fluid under high pressures. In this way the inner wall is expanded slightly to a greater inner diameter, whereby the insulating material experiences the desired compression.

In the following, examples of embodiments of the invention are explained with reference to the drawings.

BRIEF DESCRIPTION OF DRAWINGS

FIG. 3 is a view in section of an element in pipe form for the insulation of a pipe on the inner side; and FIG. 4 is an element of pipe form for the insulation of a pipe on the outside.

DETAILED DESCRIPTION OF PREFERRED EMBODIMENTS

Figure 1:
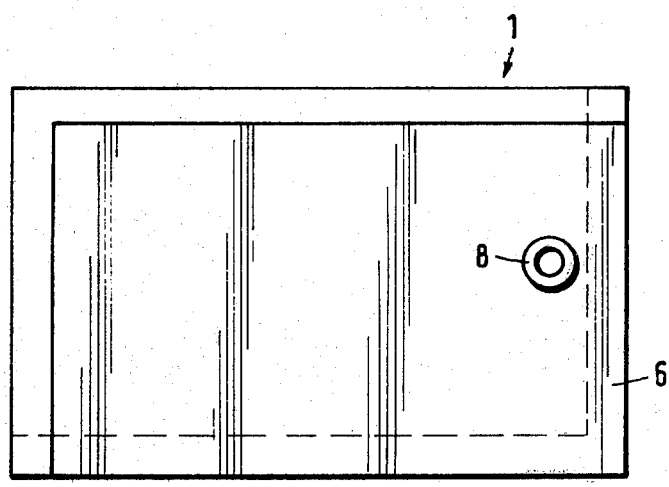
FIG. 1 is a top plan view of an insulating plate or panel according to the invention.
Figure 2:
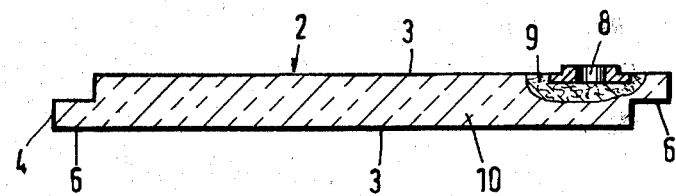
FIG. 2 is a view in section taken along line II—II of FIG. 1.

FIGS. 1 and 2 show an insulating element in the form of a plate or panel and having a sheath 2 of thin metal foil or sheet, which has an offset border 6 in order to interfit with adjacent identical elements in an overlapping fashion. The foils 3 of the sheath 2 are joined diffusion-tight at their border regions 4. This joining can be accomplished, for example, by electron-beam welding, roll-seam welding, appropriate other welding processes, or brazing. At an appropriate location of the sheath 2, e.g., on the border of the large area of the outer or inner side, there is an opening 8, which is sealable vacuum-tight in an appropriate manner and serves for filling with insulating material 10. The insulating material 10 consists of powdered diatomaceous earth of appropriate particle size, structure, and pore-form.

A porous mat 9, that as a result of its small pore size does not permit the diatomaceous earth 10 lying under it to escape into the suction pump, is located under the opening 8, which takes the form of a vacuum connection. After sealing the sheath 2, the diatomaceous earth is compressed from outside with an appropriate high pressure.

The wall 3 in which opening 8 is located can be a rigid wall rather than a foil. When so constructed, the opposing foil wall is compressed toward the rigid wall.

FIG. 3 shows a tubular arrangement 1a according to the invention, which is nested inside a pipe 12 of thick and rigid material and correspondingly insulates it. The inner wall 3a of the sheath 2a consists of a thin sheet of stainless steel, which is welded to the pipe ends, e.g., by means of a weld seam 4a preferably within pipe 12 so that the inner surface of pipe 12 at the same time forms a portion of the sheath. Diatomaceous earth 10 of appropriate structure and composition and particle size is loaded between the tin inner wall 3a and the pipe 12. There are circumferential flanges 14, between which there is a flat ring gasket 16. At the joint 6a of two pipe ends the thermal insulating elements are to be as close as possible to one another. If necessary, spaces between adjacent insulating elements are equipped appropriately with insulating material 18.

After the evacuation and the sealing of the sheath 2a, a fluid, e.g., a liquid, is introduced into the free inner space of the insulated pipe and placed under the desired pressure. The liquid pressure presses the wall 3a of the sheath 2a radially outward and by this means compresses the insulating material 10 loaded into the sheath. The pressure of the liquid is thereby chosen so high that the wall 3a is irreversibly deformed and at least the operating pressure to be expected later is reached.

The pipe 12, of thick, rigid material, lying outside in this way intercepts the pressure of the radial forces acting from the inside and thus the pipe 12 supports the wall 3a via the insulating material 10. A supporting form around the outside pipe 12 is unnecessary.

FIG. 4 shows a pipe 12b with a thermal-insulating element 1b located outside. The insulating element 1b has a sheath 2b surrounded on all sides by a sheet 3b. Powdered diatomaceous earth of appropriate structure and particle size has been loaded into the sheath 2b, if necessary precompressed, then heated and evacuated. At the pipe ends there are outer flanges 14b, which are covered with a mineral-wool insulation in the flange region. The mineral-wool insulation 20 overlaps the insulating sheath 2b for a given distance. After sealing of the sheath 2b a given pressure, which brings the sheath 2b to its final form and compresses the diatomaceous earth 10, is applied to sheath 2b.

The arrangement can have circumferentially weldable border regions in order to place many arrangements adjacent to one another. It is thus possible to provide large vessels with an inner pressure-tight, thermally insulating jacketing.

The sheath of FIG. 4 can take the form of a sleeve with foil walls completely enclosing the insulation 10 and which is slid axially around the pipe after the vacuum is drawn and the sheath is sealed. The sleeve can then be radially compressed inwardly against the pipe.

Alternatively the sheath of FIG. 4 can have an end of its foil wall 3b welded to the rigid pipe as in the embodiment of FIG. 3 so that the pipe forms a wall of the sheath.

Of course, the arrangement of FIG. 3 can include an insulator in which the insulating material is wholly contained within a sheath having foil walls. In such an arrangement the foil sheath after the vacuum is drawn is placed in the pipe 12 and internal pressure is applied to expand the sheath radially outwardly against the inside of the pipe. Ends of the foil sleeve can be welded either to the pipe or to each other to prevent fluid flowing through the pipe from entering the region between the inside of the pipe and outside of the sheath.

While several preferred forms of the invention have been shown and described, numerous changes can be made without departing from the scope of this invention.

What is claimed is:

1. A thermally insulated high pressure vessel comprising, a thick outer wall, an inner wall radially spaced from and within the outer wall, said inner wall being thinner than said outer wall and defining a space between the inner wall and the outer wall, a powder insulating material completely filling said space, and a high vacuum within said space, said inner wall comprising a flexible wall irreversibly compressed toward said outer wall and deformed against said insulating material after the high vacuum is created in said space.

2. A high pressure vessel according to claim 1 wherein, said vessel comprises a pipe, said inner wall is sealed to each end of the pipe, and said vacuum is a dry gas and moisture free vacuum created by heating the insulation in the space as the vacuum is created.

3. A high pressure vessel according to claim 1 or 2 wherein, said inner wall comprises a stainless steel wall.

* * * * *